E. L. WIEGAND.

EMPLACING APPARATUS.

APPLICATION FILED JULY 15, 1922.

Reissued Oct. 24, 1922.

15,479.

3 SHEETS—SHEET 1.

Inventor

Edwin L. Wiegand

By Hull, Brock & West

Attorneys

E. L. WIEGAND.

EMPLACING APPARATUS.

APPLICATION FILED JULY 15, 1922.

Reissued Oct. 24, 1922. 15,479.

3 SHEETS—SHEET 2.

Inventor

Edwin L. Wiegand

By Hull, Brock & West

Attorneys

E. L. WIEGAND.

EMPLACING APPARATUS.

APPLICATION FILED JULY 15, 1922.

Reissued Oct. 24, 1922. 15,479.

3 SHEETS—SHEET 3.

Inventor

Edwin L. Wiegand

By Hull, Brock & West

Attorneys.

Reissued Oct. 24, 1922. Re. 15,479

UNITED STATES PATENT OFFICE.

EDWIN L. WIEGAND, OF PITTSBURGH, PENNSYLVANIA.

EMPLACING APPARATUS.

Original No. 1,387,029, dated August 9, 1921, Serial No. 423,470, filed November 11, 1920. Application for reissue filed July 15, 1922. Serial No. 575,430.

*To all whom it may concern:*

Be it known that I, EDWIN L. WIEGAND, a citizen of the United States, residing at Pittsburgh, in the county of Allegheny and State of Pennsylvania, have invented certain new and useful Improvements in Emplacing Apparatus, of which the following is a full, clear, and exact description, reference being had to the accompanying drawings.

This invention relates to emplacing apparatus and more especially to a hydraulically actuated apparatus of this character.

Among its objects are the production of a highly reliable and conveniently operated hydraulic means for embedding an element in a base or body of impressionable material (as, for example, the conducting member or resister element of an electric heating device, in the supporting and insulating matrix), the same being accomplished with a degree of ease and precision that assures perfection and absolute uniformity of product; the production of apparatus that will facilitate and cheapen the manufacture of electric heating devices or other articles to the making of which my invention is applicable, permitting the employment of inexperienced and unskilled labor for doing what only experts have been able to satisfactorily accomplish heretofore; the inclusion of means in an apparatus of the aforesaid character that will prevent the machine's being operated except when the element that is to be emplaced is in proper relation to a base arranged to receive it; and the provision of a main pressure fluid actuated mechanism for effecting the emplacement of the element in the base, and auxiliary pressure fluid actuated mechanism for causing the removal of the element from the carrier when the former is properly emplaced.

A further object is the provision of an element form or carrier incoporating stripping mechanism that will automatically act to remove the element from the supporting pins of the form when the form or carrier is subjected to pressure.

Figure 1:
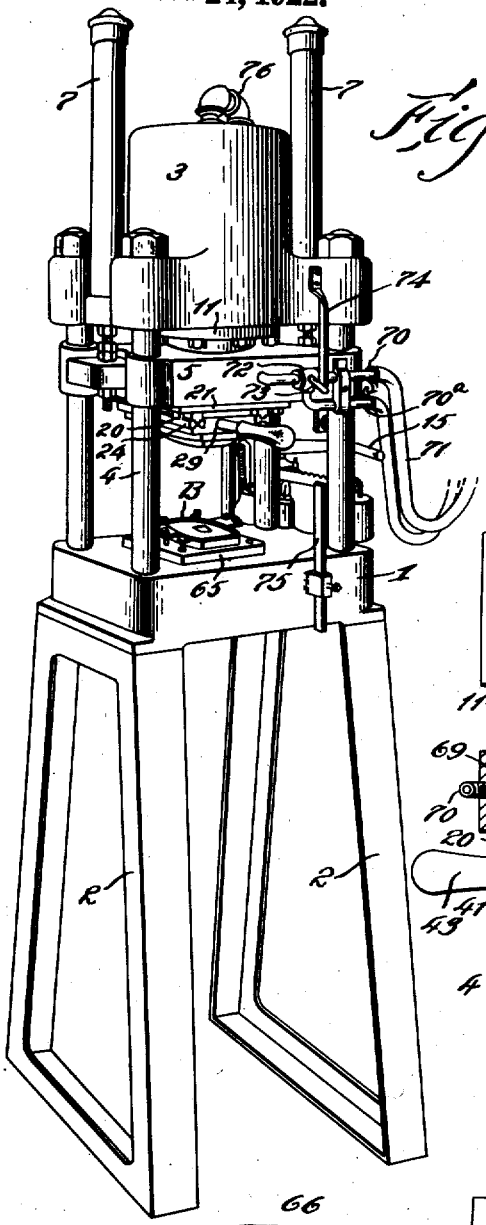
Figure 2:
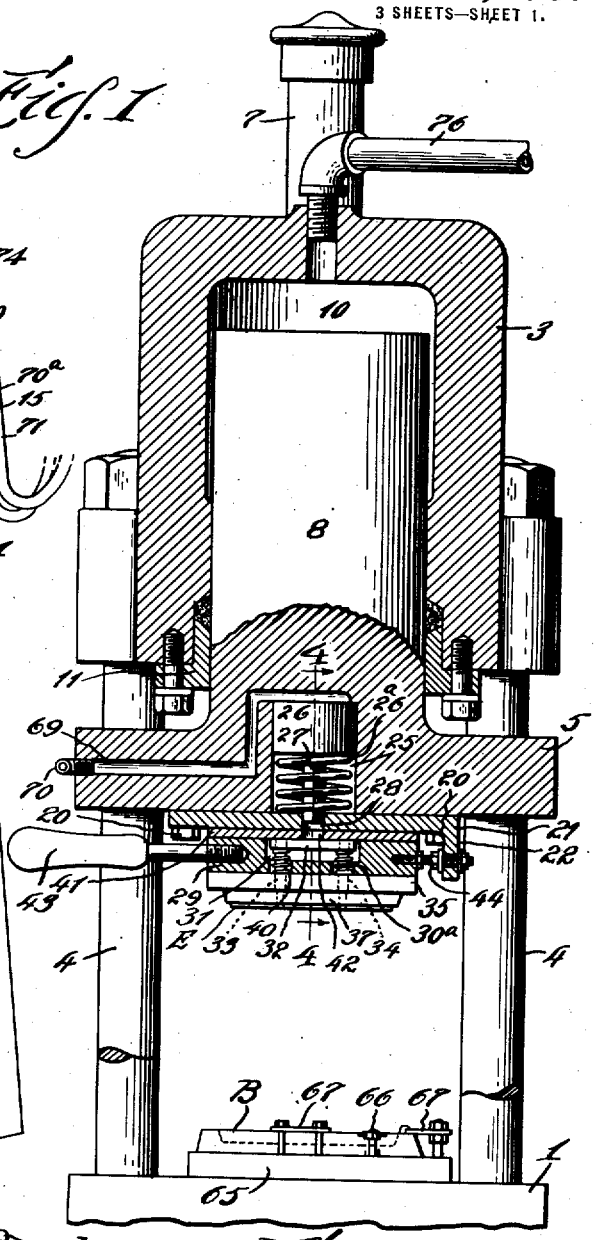
Figure 9:
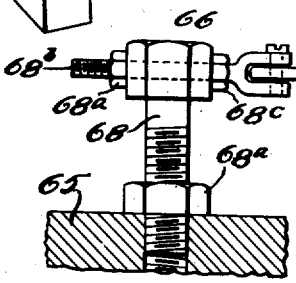
Figure 3:
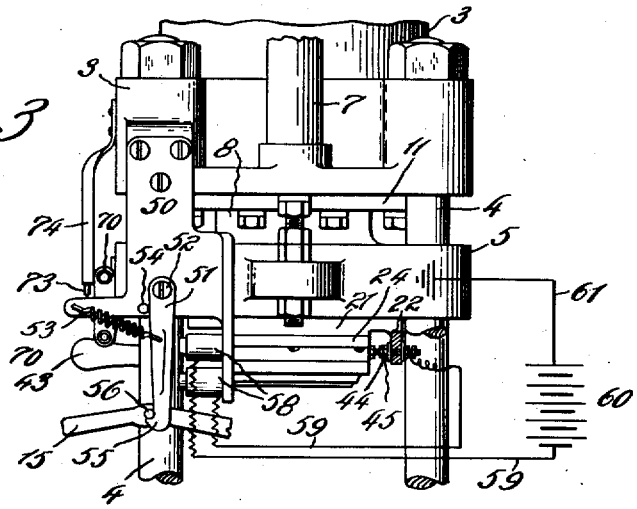
Figure 4:
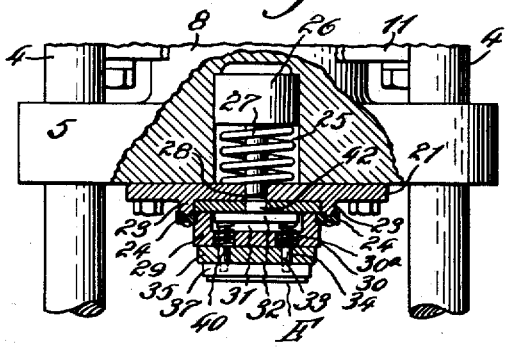
Figure 5:
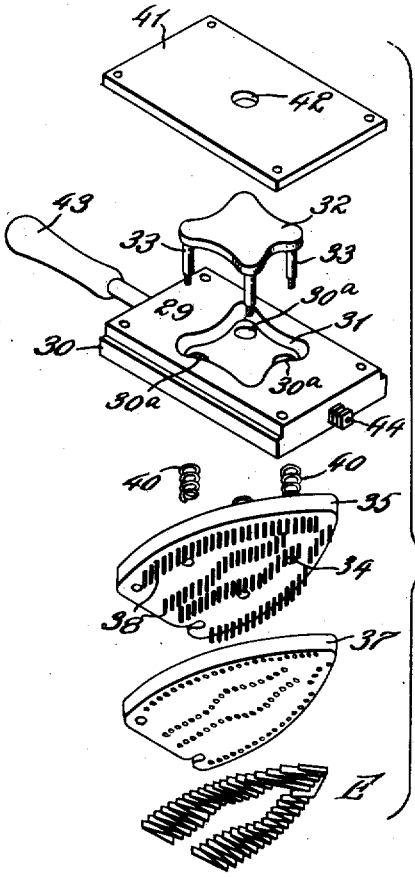
Figure 6:
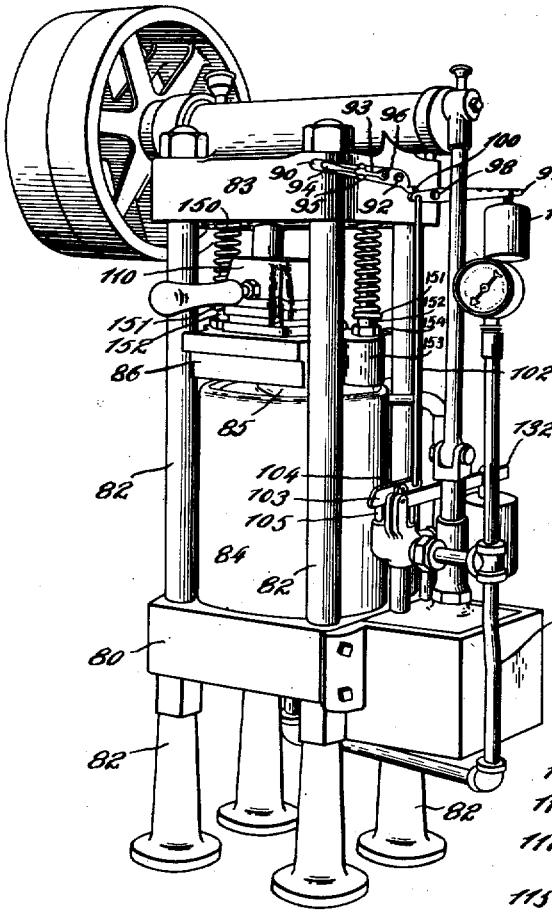
Figure 7:
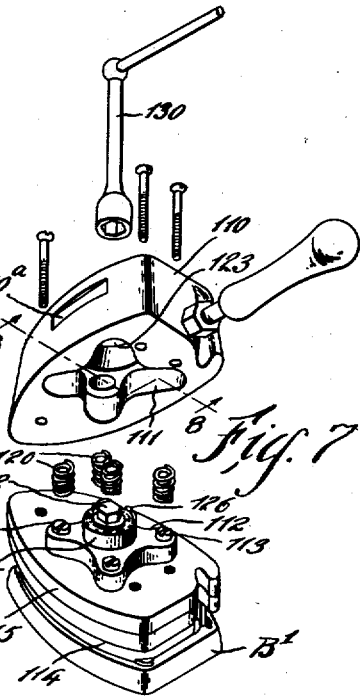
Figure 8:
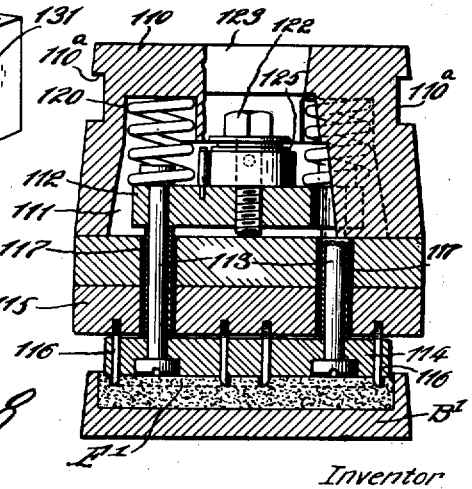

The foregoing objects, and others which will become apparent as this description proceeds, are attained in the embodiments illustrated in the drawings accompanying and forming a part thereof, and wherein Fig. 1 is a perspective view of a hydraulic emplacing machine incorporating my invention; Fig. 2 is a somewhat enlarged central vertical section, from front to rear, through the upper part of said machine; Fig. 3 is a fragmentary side elevation of the machine in the region of the movable platen and it includes a diagram of the electric circuit through which the means is controlled for preventing the machine's being operated except when the work is properly positioned therein; Fig. 4 is a sectional detail on the line 4—4 of Fig. 2; Fig. 5 shows, in perspective and in separated condition, the parts whereof the element carrier or form first to be described is comprised; Fig. 6 is a perspective view of another form of hydraulic machine incorporating my improvements; Fig. 7 is a perspective view, with the part separated, of a modification of the form or element carrier, the view including the receiving element or base; Fig. 8 is a sectional detail through the form and base, the plane of section being indicated by the line 8—8 of Fig. 7; and Fig. 9 (Sheet 1) is a detail of a work locating stop.

I take as a basis for my improvements a standard type of hydraulic press comprising a stationary platen 1 that is supported, by standards 2 a suitable distance above the floor, and a cylinder casting 3 is sustained a proper elevation above the stationary platen by posts 4. A movable platen 5 is guided in the usual manner upon the posts 4 and is adapted to be retracted by pull-back springs (not shown) that are housed within the tubular casings 7 which rise from the opposite sides of the cylinder casting 3. The movable platen 5 is carried by a ram 8 which operates within the cylinder 10 of the casting 3, a packing gland 11 closing the joint between the ram and cylinder wall. The press may be controlled by any suitable and well known valve arrangement involving an operating lever 15. In view of the fact that such valve arrangements and their methods of operation are so familiar to those skilled in the art, a detailed description and showing of this feature is deemed unnecessary in this connection, and the action of the control will be readily understood from the description of the same as it forms a part of the explanation hereinafter given of the operation of the machine as a whole.

To the under surface of the movable platen 5 I secure, as by means of screws 20, a form holder 21, from the rear end of which depends a lug 22. Laterally spaced parallel ribs 23 are incorporated in the form holder and to these ribs are applied rails 24. The base of the form holder serves, in the present arrangement, to close the outer end of an auxiliary cylinder 25 that is formed within the movable platen and ram, and this cylinder contains a piston 26, the rod 27 whereof projects through an aperture 28 in the base of the form holder.

The element carrier or form designated generally by the reference numeral 29, is composed of a rectangular body 30 which has a central cavity 31 opening through its upper surface and within which operates a yoke or spider 32 that carries a plurality of pins 33 which project through holes 30[a] in the body 30 and through apertures 34 in a face plate 35 that is secured by suitable means to the underneath side of the body 30. The lower ends of the pins 33 are screwed into a stripper 37 that is reciprocable along the element carrying pins 38 that depend from the face plate 35. Springs 40 surround the pins 33 and are confined between the yoke or spider 32 and the face plate 35, occupying, as they do, the holes 30[a]; and these springs tend to elevate the yoke or spider and retract the stripper 37 so that the ends of pins 38 protrude beyond the stripper sufficiently to have wound upon them and support the heating resister element E. A plate 41, having a central aperture 42, is applied to the upper side of the body portion 3 and serves to close the opening 31. It will be observed that the sides of the body portion 30 are rabbeted along their upper edges so as to provide grooves when the plate 41 is applied to the body portion it being noted, by reference to Fig. 4, that said plate is of the same width as the body portion. A handle 43 is applied to one end of the body portion 30 and an adjustable stop 44 to the other.

From an inspection of Fig. 3 it will be seen that a contact member 45 is carried by, and is insulated from, the lug 22 of the form holder 21. This member is in a position to be engaged by the adjustable stop 44 when the form occupies the holder and is properly situated therein. A bracket 50 depends from the forward right hand corner of the cylinder casting 3 and a latch 51 is pivoted at 52 to the bracket, and the same is retained by a spring 53 in a forward position against a stop 54. In such position the nose 55 of the latch is projected beneath a pin 56 on the valve operating lever 15. The latch 51 constitutes an armature for an electro-magnet 58 that is sustained in operative relation to the armature by the aforesaid bracket 50. The electro-magnet 58, with the previously mentioned contact member 45, is in one branch 59 of an electric circuit that includes a suitable source of power indicated as a battery 60, and the other branch 61 of the circuit is grounded to the machine. As a consequence, when the form is placed within the holder with its stop 44 engaging the contact member 45, the circuit will be closed and the electro-magnet 58 energized to attract the latch 51 and unlock the valve actuating lever 15.

A bolster 65 is mounted upon the stationary platen 1 and the same is equipped with suitable gauges and retaining means 66 and 67 respectively, for properly positioning and holding the receiving element or base B. For the gauges 66, I prefer to employ the style of roller stop illustrated in detail in Fig. 9 (Sheet 1). This stop designated generally by the numeral 66, is composed of a stud 68, threaded into the bolster 65, and locked in a properly adjusted position by a nut 68[a]. A screw 68[b] is threaded for adjustment through the head of the stud; is held in adjustment by lock-nuts 68[c]; and carries a roller 68[d] for engagement with the work. This anti-friction style of gauge or stop possesses the obvious advantage over the rigid type in that any irregularities on the work are not liable to catch on the stop and deceive the operator into supposing the work is properly positioned within the machine when as a matter of fact it is not. The base B which, in the present case, is the face plate of electric sad iron, contains a filler of plastic or impressionable material within which the element E is to be embedded.

A port 69 leads in through the front of the movable platen 5 to the auxiliary cylinder 25, and a pipe 70 communicatively connects the port with a flexible tube 71 which leads from a source of pressure fluid supply (not shown). The pipe 70 includes a three way valve 72, the operating handle 73 whereof is adapted to be engaged and moved by a stop 74 that is carried by the cylinder casting 3, when the movable platen 5 is elevated, and which is adapted to engage and be moved by an adjustable stop 75 that rises from the stationary platen 1, when the movable platen is depressed. The outlet side of the valve 72 is shown as having an exhaust pipe 70[a] connected to it.

In the use of the present machine, the operator after placing base B on the bolster 65, takes the form whereon the element EE has been previously wound and inserts it within the guides 24 of the form holder until the stop 44 engages the contact member 45, resulting in the energization of the magnet 58 and the release of the latch 51, as hereinbefore explained. The operator now depresses the lever 15 which closes the usual by-pass valve and directs the hydraulic pressure fluid through a pipe 76 into cylinder 10. As the hydraulic pressure fluid accumulates within the cylinder it depresses the ram 8 and lowers the movable platen 5, with the form supported thereby, until the element E is embedded within the base B. The movement of the ram thus arrested, hydraulic pressure builds up within the cylinder and pipe 76 until, according to the common and well known operation of the valve mechanism of hydraulic presses, the check valve of the pump is lifted and retained off its seat, rendering the pump ineffective. In the meantime, as the movable platen descends, the operating handle 73 of the valve 72 engages the stop 75 and positions the valve to admit pressure fluid to the auxiliary cylinder 25. This results in a depression of the piston 26 and a projection of its rod 27 through the aperture 42 of the form and the engagement of the rod with the yoke or spider 32. Now, when the operator returns the valve actuating lever 15 to its upper or normal position, he thereby opens an escape for the hydraulic pressure fluid that has been confined within the cylinder 10, allowing the pull-back springs that are enclosed within the casings 7 to retract the movable platen 5. This will be readily understood by those familiar with the operation of hydraulic presses. During the initial upward movement of the platen 5 and form 29 the stripper 37 is held down by the rod 27 of the piston 26, thus retaining the element E within the base B while retracting the element supporting pins 38 into the pin bores of the stripper. The stripper and its actuating mechanism will retain their depressed positions until the operating handle 73 of the valve 72 engages the stop 74, when the valve will be positioned to exhaust the auxiliary cylinder 25, allowing springs 40 to return the stripper to its original position, and permitting a spring 26ᵃ to retract the piston 26.

In Fig. 6, my invention is shown incorporated in another form of hydraulic press wherein 80 is a base from the corners of which rise posts 82 that support a stationary platen 83 at their upper ends. A cylinder 84 is mounted upon the base 80 and the ram 85, which operates within this cylinder, carries a movable platen 86.

An operating lever 90 is pivoted at 92 to the side of the stationary platen 83 in convenient reach of the operator and it is adapted to be held in its elevated position by a latch 93 having a grip portion 94 by means of which the latch may be released. The latch is pivoted at 95 to the side of the lever 90 and has a pin 96 which projects through the lever and is adapted to engage within an aperture (not shown) in the stationary platen 83.

Pivoted at 98, to the platen 83, is a weight lever 99 which has its forward end disposed beneath a projection 100 on the rear of the lever 90, and its rear end notched for the adjustable attachment of a weight 101. The forward end of the weight lever is connected, through a link 102, with the rear end of a rocker arm 103 that is pivoted at 104 to a stationary part of the machine, the forward end of the arm 103 engaging the stem 105 of the usual by-pass valve.

The form or element carrier which I have shown as used with this style of press is illustrated in detail in Figs. 7 and 8, and the same comprises a body 110 having a recess 111 within which is housed a yoke or spider 112 that is connected, through pins 113, with a stripper 114, the pins 113 operating through bores in the face plate 115 that is applied to the underneath side of the body 110, and from which depends the element supporting pins 116. The pins 113 are shown as having sleeves 117 applied to them for the purpose of properly spacing the stripper from the spider or yoke 112. Comparatively heavy compression springs 120 are confined between the arms of the spider 112 and the opposed walls of the recess 111 and tend to depress the spider. 122 is a screw that is threaded through the spider 112 and bears upon the inner side of the face plate 115, and access to the head of this screw may be had through an opening 123 in the body 110. A spiral spring 125 has one of its ends attached to the screw 122 and its opposite end anchored, by means of a pin 126, to the spider 112. The spring tends by reason of its direction of winding, to unscrew the screw 122. In Fig. 8 the entering element is designated E′, and in Fig. 7, as well as in Fig. 8 the base is designated B′.

In preparing the present form illustrated in detail in Figs. 7 and 8, for the press or emplacing machine, a socket wrench of the character of that designated 130 in Fig. 7, is inserted through the opening 123 of the body 110, applied to the head of the screw 122, and turned in the direction to cause the screw to retract the spider 112 and with it the stripper 114, until the latter is in firm contact with the face plate 115. This turning of the screw 122 is in opposition to the spiral spring 125, but said spring is not of sufficient strength to turn the screw in the opposite direction when the screw is in engagement with the face plate 115 because of the friction imposed upon the threads of the screw by the comparatively heavy compression springs 120 which are constantly tending to depress the spider. With the screw 122 thus restrained against turning in a direction to permit the spider and stripper to be depressed by the springs 120, the element E′ may be wound upon the pins 116 where they protrude beyond the stripper. After the element is so placed upon the form, the wrench 130 is applied to screw 122 and the screw is turned in a backward direction sufficiently to slightly separate the stripper 114 from the face plate 115. In this condition, the form, with the element E′, is placed upon the base B′ and the whole is set upon the movable platen 86 of the press, and retained in proper position by suitable locating means (not shown). The latch 93 is operated to withdraw its pin 96 from the retaining hole in the stationary platen 83, thus unlocking lever 90 and allowing it to be lowered. This results in the rear end of the lever rising, allowing the weight 101 to actuate its lever 99 and, through the link 102, to rock the arm 103 in a direction to close the by-pass valve 105, whereupon the hydraulic pressure fluid is forced through the pipe 131 to the cylinder 84, all of which will be readily understood by those familiar with this class of machines. The ram 85 being thus actuated it moves platen 86 upwardly until the form and base are compressed between the platens. This results in the entering element being embedded within the receiving element, and the ram 85 being brought to a stop. As the pressure thereafter builds up within the cylinder, the safety valve 132 operates to render the pump ineffective, as in the former example.

When the parts are compressed between the movable and stationary platens, the stripper 114 is pressed back against the face plate 115, elevating the spider 112 through the intervention of the pins 113 and spacers 117 and against the tension of the springs 120 until the end of the screw 122 is lifted out of contact with the face plate 115. This relieves excessive friction on the threads of the screw and allows the spiral spring 125 to turn the screw in a direction to withdraw it. Now when the movable platen 86 is retracted, the springs 120 expand and lift the body 110, and with it the face plate 115 and pins 116 withdrawing the pins 116 from the base and leaving the element E′ embedded therein. The cylinder is exhausted of hydraulic pressure fluid by the return of handle 90 to normal position, allowing push-back springs 150 and the weight of the movable platen and ram, with the form and base, to return the parts to their normal positions. The push-back springs 150 are interposed between the stationary platen 83 and shoulders 151 on rods 152 that are threaded for adjustment within ears 153 on the sides of the movable platen 86. Lock-nuts 154 serve to hold the rods 152 in proper adjustment.

I may explain that the two types of forms herein illustrated are interchangeable between the two machines or presses, the one being more desirable in certain classes of work than the other as, for instance, the form illustrated in Figs. 7 and 8, has been found very satisfactory for heavy work. Also, it will be understood that the form holder, and the base-positioning-and-retaining means that are shown in connection with the type of press illustrated in Fig. 1 may be utilized in connection with the press illustrated in Fig. 6. It will be noted that the form shown in Figs. 7 and 8 is provided with grooves 110ᵃ on its opposite sides so that it can be inserted in the form holder 21 of the machine first described. The same would be obtained by applying the plate 41 of Fig. 5 to the upper surface of the form body 110. It is somewhat to be preferred that the form be carried by one of the press members and withdrawn from the work when such members are separated, rather than in the manner illustrated in Fig. 6.

Having thus described my invention, what I claim is:

1. In a machine of the character set forth, the combination of two press members, one of which is movable toward and from the other, hydraulic means for actuating the movable member, a movable control member for governing the hydraulic means electro-magnetic means for locking the control member in inoperative position, an electric circuit including an electro-magnetic means, and means rendered effective by the placement of work between the press members for closing the circuit thereby to energize the electro-magnetic means and unlock the aforesaid control member.

2. In a machine of the character set forth, the combination of two press members, one of which is movable toward and from the other, hydraulic means for actuating the movable member, a movable control member for governing the hydraulic means, a latch for locking the control member in inoperative position, electro-magnetic means for unlatching the latch, an electric circuit including the electro-magnetic means, and means rendered effective by the placement of work between the press members for closing said circuit.

3. In a machine of the character set forth, the combination of two press members, one of which is movable toward and from the other, hydraulic means for actuating the movable member, a movable control member for governing the hydraulic means, a latch for locking the control member in inoperative position, and means rendered effective by the placement of work between the press members for unlatching the latch.

4. In a machine of the character set forth, the combination of a pair of members constituting respectively a support for a receiving element and a holder for an entering element, one of said members being movable toward and from the other, mechanism for effecting the removal of the entering element from the holder when the entering element has been emplaced within the receiving element, and pressure fluid means for actuating said mechanism.

5. In a machine of the character set forth the combination of a pair of elements constituting respectively a support for a receiving element and a holder for entering element, one of said members being movable toward and from the other, pressure fluid mechanism for effecting the separation of the entering element and the holder after the entering element has been emplaced within the receiving element, and means operated by reason of the movement of the movable member for delivering pressure fluid to said mechanism.

6. In a machine of the character set forth, the combination of a pair of members constituting respectively a support for a receiving element and a holder for an entering element, one of said members being movable toward and from the other, mechanism for effecting the removal of the entering element from the holder when the entering element has been emplaced within the receiving element, and means for moving the movable member and for operating said mechanism in the order described.

7. In a machine of the character set forth, the combination of a stationary platen, and a movable platen, hydraulic means for moving the movable platen toward the stationary platen, a carrier for an entering element which, with a receiving element, are adapted to be placed between said platens, and means for effecting the removal of the entering element from the carrier when said entering element has been emplaced within the receiving element.

8. In a machine of the character set forth, the combination of a stationary platen, and a movable platen, hydraulic means for moving the movable platen toward the stationary platen, a carrier for an entering element which, with a receiving element, are adapted to be placed between said platens, and means incorporated within the carrier for effecting the removal of the entering element from the carrier when said entering element has been emplaced within the receiving element.

9. In a machine of the character set forth, the combination of a stationary platen and a movable platen, hydraulic means for moving the movable platen toward the stationary platen, a form holder sustained by the movable platen, a form equipped with means for carrying an entering element, and adapted to be placed in said holder and a stripper for effecting the removal of the entering element from said means when said entering element has been emplaced within a receiving element supported by a stationary platen.

10. In a machine of the character set forth, the combination of a stationary platen, a movable platen, hydraulic means for moving the movable platen toward the stationary platen a form holder sustained by one of the platens, means on the other platen for positioning a receiving element, a form adapted to be placed within the holder and equipped to support an entering element, and means for effecting the removal of the entering element from the form when emplaced within the receiving element.

11. In a machine of the character set forth, the combination of a stationary platen, a movable platen hydraulic means for moving the movable platen toward the stationary platen, a form holder sustained by the movable platen, means on the stationary platen for positioning a receiving element, a form adapted to be placed within the holder and equipped to support an entering element, said form incorporating means for effecting the removal of the entering element from the form when emplaced within the receiving element, and means carried by the movable platen for actuating said removing means.

12. In a machine of the character set forth, the combination of a stationary platen having means for positioning a receiving element thereon, a movable platen, hydraulic means for moving the movable platen toward the stationary platen, a holder sustained by the movable platen, a form adapted to be placed within the holder and equipped to support an entering element, means incorporated in the form for effecting the removal of the entering element from the form when said entering element is emplaced within the receiving element, pressure fluid actuated means incorporated in the movable platen for operating the removing means, and means for directing pressure fluid to said pressure fluid actuated means.

13. In a machine of the character set forth, the combination of a stationary platen having means for positioning a receiving element thereon, a movable platen, hydraulic means for moving the movable platen toward the stationary platen, a holder sustained by the movable platen, a form adapted to be placed within the holder and equipped to support an entering element, means incorporated in the form for effecting the removal of an entering element from the form when the entering element is emplaced within the receiving element, pressure fluid actuated mechanism incorporated within the movable platen for operating the removing means, a valve for controlling the supply of pressure fluid to said mechanism, and means for automatically operating the valve when the movable platen is reciprocated.

14. In a machine of the character set forth, the combination of a stationary and movable platen, hydraulic means for moving the movable platen toward the stationary platen, a form equipped to carry an entering element and which with a receiving element, are adapted to be placed between said platens, and means incorporated in the form for effecting the removal of the entering element from the form when said entering element has been emplaced within the receiving element, said means being automatically actuated when the form and receiving element are compressed between the platens.

15. In a machine of the character set forth, the combination of two members comprising a support for a receiving element, and a carrier for an entering element, one of said members being movable toward and from the other, means for removing the entering element from the carrier when the element has been emplaced, and power propelled means for operating the movable one of the aforesaid members and the removing means and causing them to function in sequence.

16. In a machine of the character set forth, the combination of two members comprising respectively a support for a receiving element and a carrier for an entering element, one of said members being movable toward and from the other, means for removing the entering element from the carrier when the entering element is emplaced within the receiving element, and actuating means common to both the movable member and the removing means and acting to move the movable member thereby to emplace the entering element and subsequently to actuate the removing means.

17. In a machine of the character set forth, the combination of a bed, a head, the one being movable toward and from the other, and a carrier for an entering element which, with a receiving element, is adapted to be inserted between the head and the bed for the purpose of emplacing the entering element within the receiving element when the bed and the head are moved one with respect to the other.

18. In a machine of the character set forth, the combination of a bed, a head, the one being movable toward and from the other, a carrier for an entering element which, with a receiving element, is adapted to be inserted between the head and the bed for the purpose of emplacing the entering element within the receiving element when the bed and the head are moved one with respect to the other, and means incorporated within the carrier for removing the entering element from the carrier when the entering element is emplaced in the receiving element.

19. In a machine of the character set forth, the combination of two members comprising respectively a bed and a head, one of said members being movable toward and from the other, a holder carried by one of said members and a carrier for an entering element that is adapted to be placed within the holder and sustain the entering element in proper relation to a receiving element supported by the other member.

20. In a machine of the character set forth, the combination of a support for a receiving member, a head movable toward and from the support and incorporating a form holder, a form designed to be received by the holder and arranged to carry an entering element, a stripper embodied in said form for removing the entering element when the same has been emplaced within the receiving element, means carried by the head for actuating the stripper, and mechanism for reciprocating the head and for rendering the stripper effective.

21. In a machine of the character set forth, the combination of a support for a receiving element, a head movable toward and from the support and incorporating a form holder, a form designed to be received by said holder and arranged to carry an entering element, a stripper embodied in the form for removing the entering element from the form when said entering element has been emplaced within the receiving element, means guided within the head for actuating the stripper, the stripper having a part registering with said means when the form is properly positioned within the holder, and mechanism for moving the head toward and from the support and for rendering the stripper effective.

22. In a machine of the character set forth, the combination of two members comprising respectively a support for a receiving element and a head incorporating a form holder, one of said members being movable toward and from the other, a form designed to be received and supported by said holder and arranged to sustain an entering element in operative relation to the receiving element when said form is properly positioned within the holder, mechanism for actuating the movable one of the aforesaid members, and control means governing the operation of the actuating mechanism, said means being rendered effective to permit the operation of the actuating mechanism by the proper positioning of the form within the holder 23. In a machine of the character set forth, the combination of a support for a receiving element, a head movable toward and from the support and incorporating a form holder, a form designed to be received and supported by said holder and arranged to sustain an entering element in operative relation to the receiving element when said form is properly positioned within the holder, mechanism for actuating the head, and control means governing the operation of the actuating mechanism, said means being rendered effective to permit the operation of the actuating mechanism by the proper positioning of the form within the holder.

24. In a machine of the character set forth, the combination of two members comprising respectively a support for a receiving element and a head incorporating a form holder, the support having means for locating the receiving element in a definite position, a form designed to be received and supported by the holder and arranged to sustain an entering element in operative relation to the receiving element when the form is properly positioned within the holder driving mechanism for moving the head, and control means governing the driving mechanism and actuated to permit the operation thereof by the proper positioning of the form within the holder.

25. In mechanism of the character set forth, the combination of a holder, a form adapted to be removably supported thereby and to sustain an element, a stripper incorporated in the form for moving the element, and stripper actuating means carried by the holder.

26. In mechanism of the character set forth, the combination of a head having a cavity, stripper actuating means within the cavity, means tending to retract the former means, a form adapted to be removably applied to the head and arranged to carry an element, a stripper incorporated in the form for removing the element and having a part for cooperation with the stripper actuating means, and means for operating the stripper actuating means.

In testimony whereof, I hereunto affix my signature.

EDWIN L. WIEGAND.